(12) United States Patent
Wüster

(10) Patent No.: US 8,656,637 B2
(45) Date of Patent: Feb. 25, 2014

(54) COLD FRAME

(76) Inventor: Heinrich Wüster, Imst/Tirol (AT)

( * ) Notice: Subject to any disclaimer, the term of this patent is extended or adjusted under 35 U.S.C. 154(b) by 156 days.

(21) Appl. No.: 13/060,827

(22) PCT Filed: Aug. 27, 2009

(86) PCT No.: PCT/EP2009/006208
§ 371 (c)(1),
(2), (4) Date: May 23, 2011

(87) PCT Pub. No.: WO2010/022940
PCT Pub. Date: Mar. 4, 2010

(65) Prior Publication Data
US 2011/0209401 A1     Sep. 1, 2011

(30) Foreign Application Priority Data
Aug. 29, 2008   (AT) ................ A 1348/2008

(51) Int. Cl.
*A01G 9/16*     (2006.01)
(52) U.S. Cl.
USPC ................ 47/19.1; 47/17; 403/205
(58) Field of Classification Search
USPC ............ 47/17, 19.1, 29.1–29.3, 33, 66.1; 403/403, 205, 231
See application file for complete search history.

(56) References Cited

U.S. PATENT DOCUMENTS

| | | | | |
|---|---|---|---|---|
| 1,005,078 A | * | 10/1911 | Schwarz | 47/17 |
| 3,966,338 A | * | 6/1976 | Ghyczy | 403/192 |
| 4,429,489 A | | 2/1984 | Fischer | |
| 5,839,223 A | * | 11/1998 | Pepich | 47/29.3 |
| 7,748,162 B1 | * | 7/2010 | Necessary et al. | 47/17 |
| 2007/0028512 A1 | * | 2/2007 | McGhee | 47/17 |

FOREIGN PATENT DOCUMENTS

| | | |
|---|---|---|
| CH | 555 134 | 10/1974 |
| EP | 0 063 215 A2 | 10/1982 |
| FR | 2 538 215 A1 | 6/1984 |
| FR | 2 910 083 A | 6/2008 |
| GB | 1 280 820 A | 7/1972 |
| GB | 2 133 109 A | 7/1984 |

* cited by examiner

*Primary Examiner* — Kristen C Hayes
(74) *Attorney, Agent, or Firm* — Laurence A. Greenberg; Werner H. Stemer; Ralph E. Locher

(57) ABSTRACT

A cold frame is formed with lateral wall elements containing transparent hollow chamber panels, and supports which are provided with lateral flanges. The lateral wall elements include lateral edge areas provided with through-passages and formed by the hollow chamber panels thereof, and rest against the flanges of the supports. The lateral wall elements are connected to the supports by clamping devices. The clamping devices include clamping elements which rest against the inner sides of the hollow cavity panels forming the edge areas of the lateral wall elements and are clamped between the hollow cavity panels and the tops of positioning bars belonging to the clamping devices. The bars protrude from the through-passages of the hollow chamber panels and they are rigidly connected to the flanges of the supports.

10 Claims, 3 Drawing Sheets

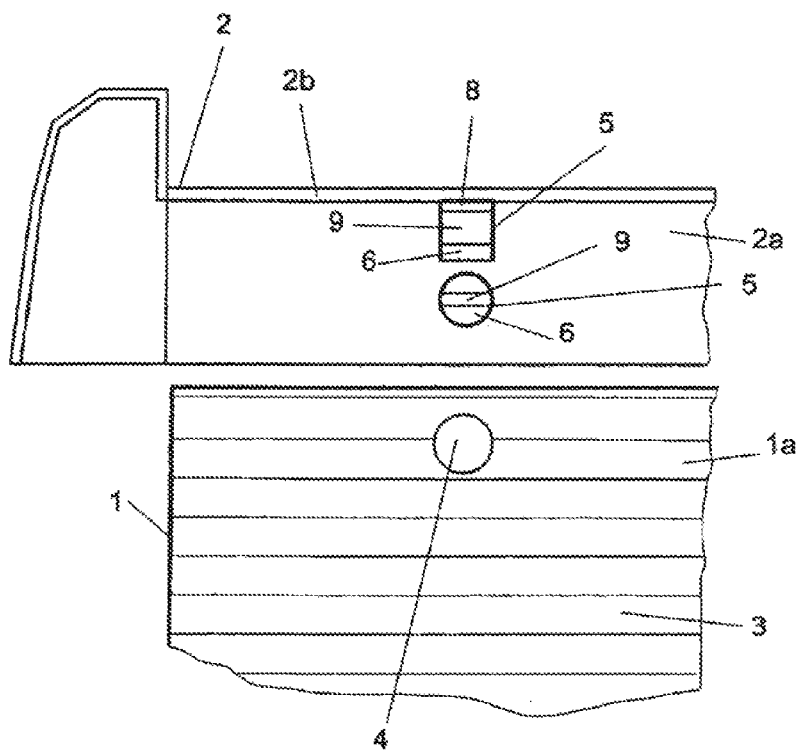
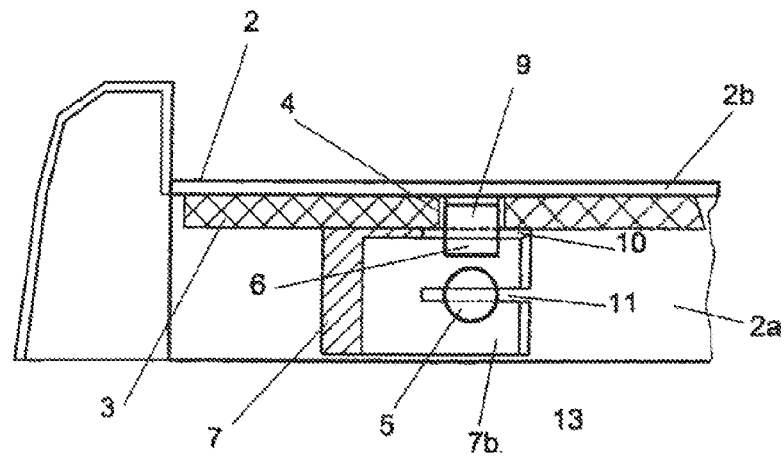

COLD FRAME

FIELD OF THE INVENTION

The invention relates to a cold frame, which has side wall elements that have highly transparent hollow chamber panels, and uprights that are provided with lateral flanges, in which the side wall elements have lateral edge regions that are formed by their hollow chamber panels, are provided with through holes, and abut against the flanges of the uprights.

PRIOR ART

EP 0 063 215 A2 discloses a frame-shaped container that is to be used as a cold frame. Here, the side walls, which are formed by highly transparent hollow chamber panels, are connected to the uprights by numerous pin-type connectors that on the one hand comprise individual parts that may be pushed loosely into one another and on the other pass through the through holes that lie one above the other and are provided in the edge regions of the hollow chamber panels and in the flanges of the uprights. When the container is assembled, the pin-type connectors are inserted into the through holes, which lie one above the other, in the hollow chamber panels and flanges and are thus put together from their individual parts. When the container is dismantled, the pin-type connectors are dismantled into their individual parts, and the side walls and the uprights are separated from one another. In so doing, care must be taken that none of the individual parts of the numerous pin-type connectors which have been dismantled into their individual parts is lost, so that when the container is later assembled a complete container can be produced. During storage of the dismantled container, the pin-type connectors that have been dismantled into their individual parts must be saved carefully so that when the container is assembled they are indeed actually available. It is disadvantageous that, in addition to the large number of individual parts of the numerous pin-type connectors of the container that have carefully to be kept safe, the pin-type connectors that are put together are slightly movable within themselves because of the play that is required for their individual parts to be pushed into one another, for which reason the side walls of the container are connected to the uprights somewhat unsteadily, a fact which becomes unpleasantly apparent when the cold frame is moved to another location in the garden.

SUMMARY OF THE INVENTION

It is the object of the invention to specify an improved cold frame.

This is achieved according to the invention with a cold frame of the type mentioned at the outset in that the side wall elements are provided with clamping devices, which connect the uprights and whereof the clamping elements abut against the inner sides of the hollow chamber panels forming the edge regions of the side wall elements and are clamped between the hollow chamber panels and the heads of positioning pins, which form part of the clamping devices, project out of the through holes in the hollow chamber panels, and are rigidly connected to the flanges of the uprights.

In the case of the cold frame according to the invention, the side wall elements are connected to the uprights by the clamping devices in a manner which is stable and yet readily releasable. The clamping elements of the clamping devices are clamped between the heads of the positioning pins and the hollow chamber panels, and by means of their outer sides they press the hollow chamber panels against the flanges of the uprights. In order to make stable connections, the clamping elements of the clamping devices are clamped between the heads of the positioning pins, which project out of the through holes in the hollow chamber panels, and the inner sides of the hollow chamber panels. To release the stable connections, the clamping elements of the clamping devices are withdrawn from between the heads of the positioning pins and the inner sides of the hollow chamber panels. The positioning pins, which are arranged in the through holes in the hollow chamber panels and project beyond the inner sides of the hollow chamber panels, are rigidly connected to the flanges of the uprights and cannot be lost during storage of the dismantled cold frame.

According to the invention, each clamping device may comprise a positioning pin, which is rigidly connected to a flange of an upright and whereof the head projects out of a through hole in a hollow chamber panel, and a clamping element, which is clamped between the head of the positioning pin and the inner side of the hollow chamber panel.

According to the invention, in the case of a clamping device which connects two side wall elements to an upright, a clamping element may be provided which abuts against the inner sides of the hollow chamber panels on both side wall elements and is clamped between the hollow chamber panels and the heads of positioning pins that project beyond the hollow chamber panels. This construction makes it possible to connect the two side wall elements stably by using an individual clamping element with the upright arranged between them.

According to a further feature of the invention, it may be provided, in the case of an upright that is arranged between two side wall elements, for a clamping device to be provided which connects the upright to both side wall elements and is provided with a clamping element that has two clamping limbs, which each abut against the inner side of the hollow chamber panel of a side wall element and are clamped between the hollow chamber panel and the head of a positioning pin that projects out of a through hole in the hollow chamber panel.

According to the invention, in the case of an upright having two flanges that are arranged at a right angle to one another, a clamping device may be provided which has a clamping element with two clamping limbs, which are arranged at a right angle to one another and are each clamped between a hollow chamber panel and the head of a positioning pin that projects out of a through hole in the hollow chamber panel.

Furthermore, it may be provided according to the invention for the positioning pins to project by means of flat webs beyond the inner sides of the hollow chamber panels, which abut against the flanges of the uprights, for the positioning pins to carry heads at their free ends, and for the clamping elements that abut against the inner sides of the hollow chamber panels to be clamped between the hollow chamber panels and the heads of the positioning pins.

According to the invention, the clamping elements may be provided with elongate slots in which the necks of the positioning pins, which are formed by the flat webs of the positioning pins, are received, and the clamping elements may be provided with clamping sections, which reach underneath the heads of the positioning pins.

The elongate slots of the clamping elements may be wedge-shaped, and wider at the open end than at the closed end.

According to the invention, the clamping elements that are provided with elongate slots may be slid onto the positioning pins that project beyond the inner sides of the hollow chamber panels, in a direction transverse in relation to the positioning pins, and thus be clampable between the hollow chamber panels and the heads of the positioning pins by means of their clamping sections.

According to the invention, the positioning pins may be made in one piece with the flanges of the uprights. The positioning pins may be integrally formed on the flanges of the uprights.

The invention will be explained in more detail below with reference to the drawings.

BRIEF DESCRIPTION OF THE DRAWINGS

In the drawings:

FIG. 3 shows part of an upright and a hollow chamber panel which is arranged next to it, FIG. 4 shows part of an upright and a hollow chamber panel which is fixed thereto.

DESCRIPTION OF EXEMPLARY EMBODIMENTS

Figure 1:
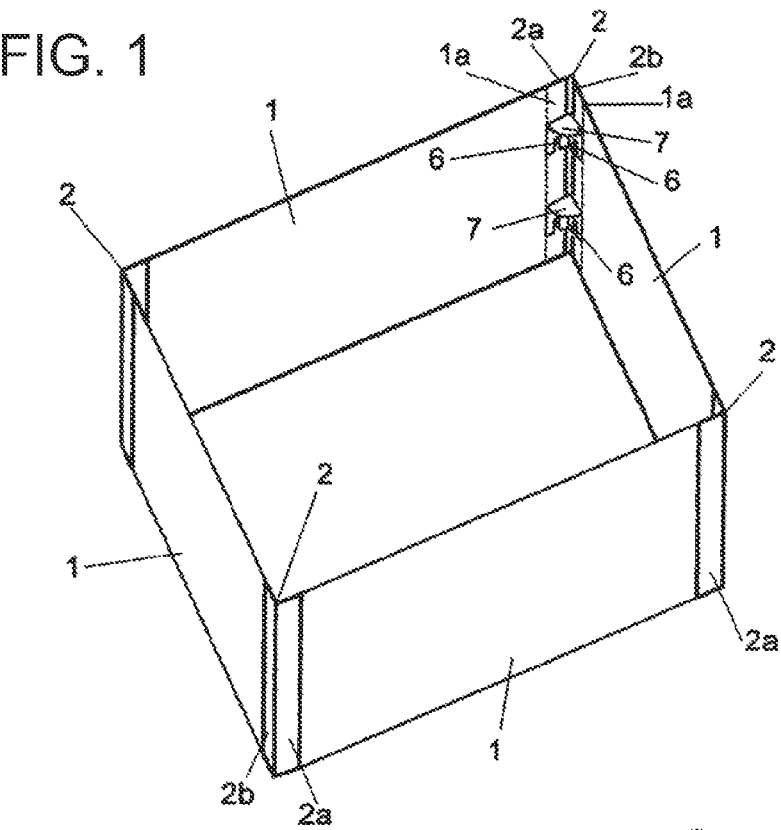
FIG. 1 shows, diagrammatically, a cold frame from above.
Figure 2:
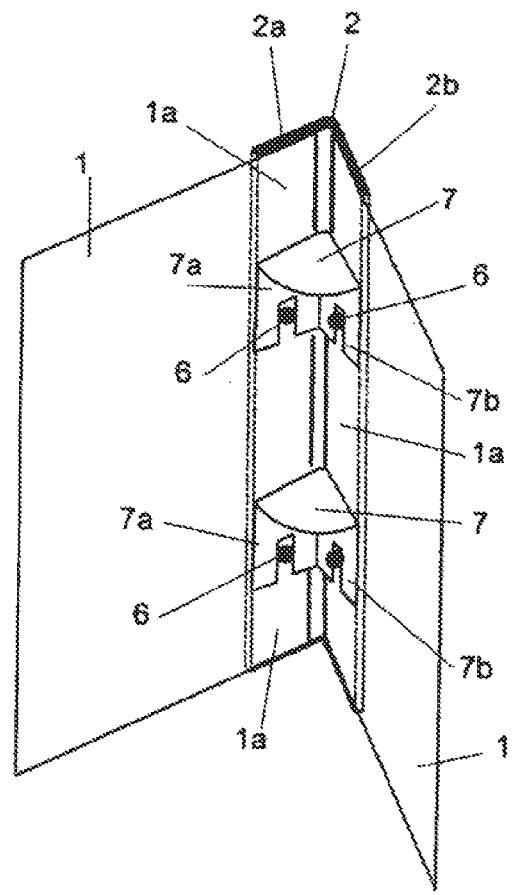
FIG. 2 shows, diagrammatically, the inner side of a corner of the cold frame.

FIG. 1 shows a cold frame which has vertically arranged side wall elements 1 and vertical uprights 2. The side wall elements 1 abut by means of their lateral edge regions 1a against the lateral flanges 2a, 2b of the uprights 2. The side wall elements 1 are provided with highly transparent hollow chamber panels 3 which include, in the lateral edge regions 1a of the side wall elements 1, two through holes 4 which are separated by a relatively large spacing. The flanges 2a, 2b of the uprights 2 carry positioning pins 5 which protrude at a right angle, which are arranged in the through holes 4 in the hollow chamber panels 3, and whereof the heads 6 project beyond the hollow chamber panels 3. Clamped between the heads 6 of the positioning pins 5 and the hollow chamber panels 3 of the side wall elements 1 are clamping elements 7 which press the hollow chamber panels 3 against the flanges 2a, 2b of the uprights 2. The side wall elements 1 are connected stably to the uprights 2 by clamping devices which each comprise a positioning pin 5 and a clamping element 7. The positioning pin 5 is rigidly connected to a flange 2a, 2b of an upright 2, and its head 6 projects beyond the inner side of a hollow chamber panel 3. The clamping element 7 abuts against the inner side of the hollow chamber panel 3 and is clamped between the latter and the head 6 of the positioning pin 5.

From each of the two flanges 2a, 2b of the uprights 2 there protrude two positioning pins 5, which are arranged at the same height and whereof the heads 6 each project beyond a hollow chamber panel 3 that abuts against the relevant flange 2a, 2b. A common clamping element 7 is provided for the two positioning pins 5 that are arranged at the same height, and this has two clamping limbs 7a, 7b, which are each associated with a flange 2a, 2b of the upright 2 and are clamped between the hollow chamber panel 3 that abuts against this flange 2a, 2b and the head 6 of the positioning pin 5 that projects beyond this hollow chamber panel 3.

The positioning pins 6 each have three sections which succeed one another in the longitudinal direction of the positioning pins 5: a base section 8 which protrudes at a right angle from the relevant flange 2a, 2b of the upright 2; a flat web 9 which adjoins the base section 8—this web 9 forms the neck of the positioning pin 5, which is provided with two lateral pinch points. The web 9 projects beyond the inner side of the hollow chamber panel 3 that abuts against the flange 2a, 2b; the head 6 of the positioning pin 5 adjoins the web 9. The head 6 is arranged spaced above the inner side of the hollow chamber panel 3 and projects laterally beyond each of the two side faces of the flat web 9. The clamping element 7 that is clamped between the head 6 of the positioning pin 5 and the hollow chamber panel 3 reaches underneath the head 6 of the positioning pin 5 by means of a clamping section that reaches almost to the flat web 9 of the positioning pin 5 and its side face.

FIG. 3 shows the upper half of an upright 2 having a first flange 2a, which is shown as horizontal in the drawing, and a second flange 2b, which is shown as upright in the drawing. For both flanges 2a, 2b, a respective positioning pin 5 is provided, at the same height and protruding at a right angle from the flange 2a, 2b. The two positioning pins 5 each have a base section 8 that adjoins the flange 2a, 2b, a flat web 9 that adjoins the base section 8, and a head 6 that adjoins the flat web 9. Next to the first flange 2a there is shown a hollow chamber panel 3 of a side wall element 1. In the lateral edge region 1a of the side wall element 1, the hollow chamber panel 3 is provided with a through hole 4. When the cold frame is assembled, the side wall element 1 is laid on the inner side of the first flange 2a by means of its lateral edge region 1a. At the same time, the hollow chamber panel 3 is pushed over the positioning pin 5 of the first flange 2a by means of its through hole 4. When the hollow chamber panel 3 lies on the first flange 2a, the head 6 of the positioning pin 5 projects beyond the inner side of the hollow chamber panel 3.

FIG. 4 shows the upper half of an upright 2 having a hollow chamber panel 3 that is clamped to the second flange 2b, which is shown as upright in the drawing. The hollow chamber panel that is clamped to the first flange 2a, which is shown as horizontal in the drawing, is not shown in FIG. 4 for the sake of better clarity.

The hollow chamber panel 3 abuts against the front side of the flange 2b. The positioning pin 5 of the second flange 2b projects through the through hole 4 of the hollow chamber panel 3, beyond the inner side thereof. The base section 8 of the positioning pin 5 is completely inside the through hole 4 in the hollow chamber panel 3. The flat web 9 of the positioning pin 5, which adjoins the base section 8, projects beyond the inner side of the hollow chamber panel 3. The head of the positioning pin 5 is arranged just above the inner side of the hollow chamber panel 3. Clamped between the inner side of the hollow chamber panel 3 and the head of the positioning pin 5 is a clamping limb 7a of the clamping element 7.

The clamping element 7 has two clamping limbs 7a, 7b, which are arranged at an angle to one another. They are each provided with an elongate slot 10, 11 that is laterally delimited by two clamping sections 12 and 13 respectively. The elongate slot 10, 11 receives the flat web 9 of a positioning pin 5 that protrudes from the respective flange 2a, 2b. The clamping sections 12 and 13 that delimit the respective elongate slots 10 and 11 reach underneath the head 6 of the positioning pin 5. The respective clamping sections 12 and 13 of the two clamping limbs 7a, 7b are each clamped between the head 6 of the positioning pin 5 and the hollow chamber panel 3 that is arranged at the underside of the clamping limb 7a, 7b.

Figure 5:
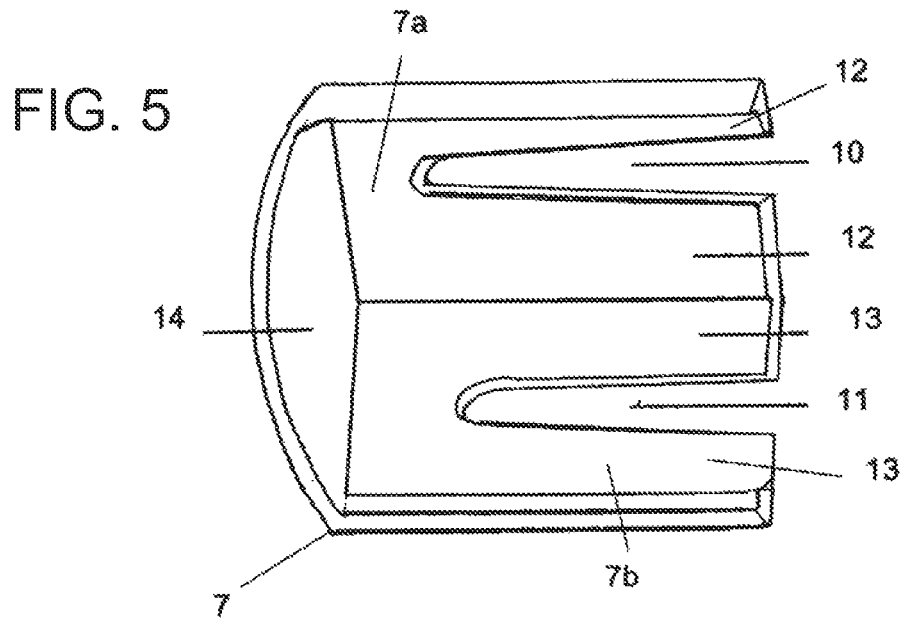
FIG. 5 shows a clamping element.

FIG. 5 shows an embodiment of the clamping element 7 having two clamping limbs 7a, 7b that are arranged at a right angle to one another and are each provided with an elongate slot 10 and 11 respectively. The two elongate slots 10, 11 are open at the lower edge of the clamping element 7. The two elongate slots 10, 11 are wedge-shaped and are wider at the open, lower end than at the upper, closed end. The two clamping limbs 7a, 7b are connected at the upper edge of the clamping element 7 by a transverse wall 14.

Figure 6:
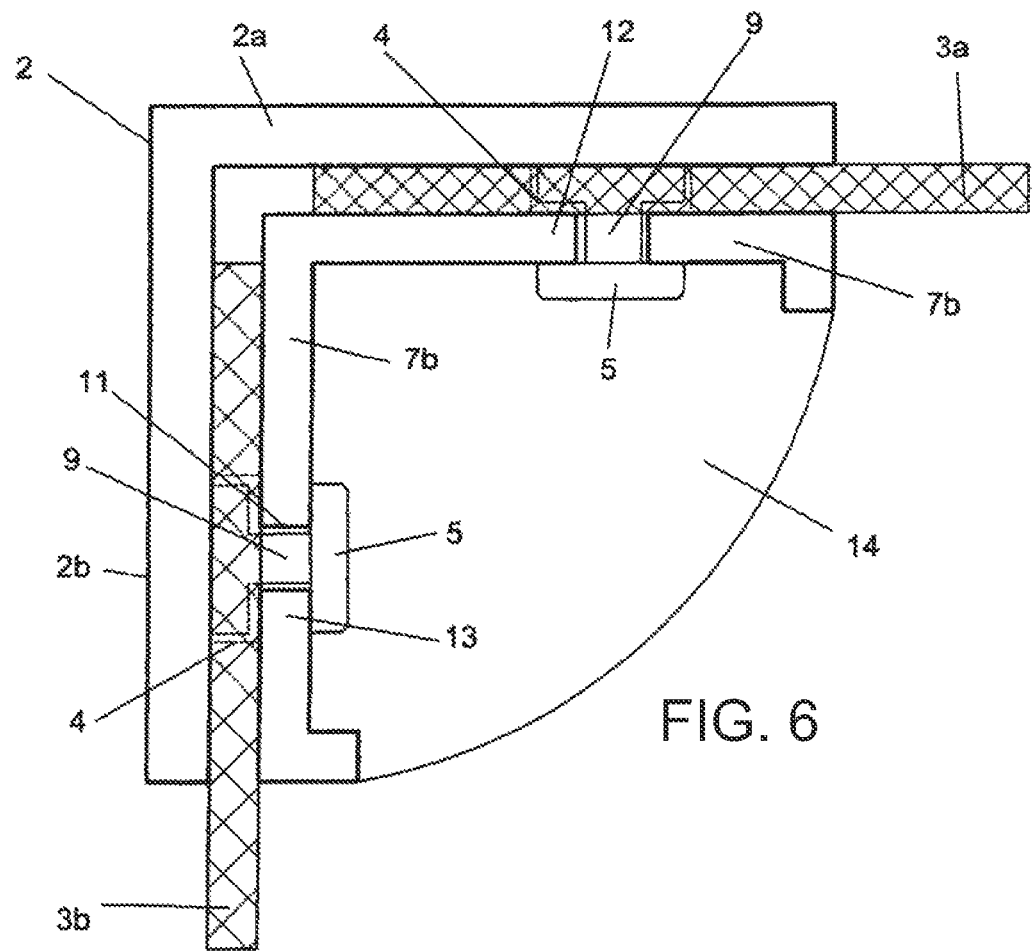
FIG. 6 shows a corner of the cold frame from below.

FIG. 6 shows a corner of the cold frame from below. The upright 2 has two flanges 2a, 2b, which are arranged at a right angle to one another. From these, positioning pins 5 that are arranged at the same height protrude inward. The lateral edge region, which is formed by a hollow chamber panel 3a, 3b, of a side wall element 1 abuts in each case against the respective inner side of the two flanges 2a, 2b. The positioning pins 5 pass through a through hole 4 in the hollow chamber panels 3a, 3b. The flat webs 9 of the positioning pins 5 project beyond the inner sides of the hollow chamber panels 3a, 3b. Between the heads 6 of the positioning pins 5, which are arranged at a spacing from the hollow chamber panels 3a, 3b, and the hollow chamber panels 3a, 3b there are clamped the clamping limbs 7a, 7b of the clamping element 7.

The positioning pins 5 are rigidly connected to the flanges 2a, 2b of the uprights 2. The positioning pins 5 may be made in one piece with the flanges 2a, 2b or integrally formed thereon. Preferably, the upright 2, with its two flanges 2a, 2b and the positioning pins 5 that protrude therefrom, is constructed as an injection molded part.

The invention claimed is:

1. A cold frame, comprising:
a plurality of side wall elements having transparent hollow chamber panels;
a plurality of uprights formed with lateral flanges;
said side wall elements having lateral edge regions formed by said hollow chamber panels, said lateral edge regions having through holes formed therein and abutting said lateral flanges of said uprights;
clamping devices disposed to connect said side wall elements with said uprights, said clamping devices including positioning pins formed with heads and projecting out of said through holes in said hollow chamber panels and being rigidly connected to said flanges of said uprights, said clamping devices further including clamping elements abutting against inner sides of said hollow chamber panels forming said edge regions of said side wall elements, said clamping elements being clamped between said hollow chamber panels and said heads of said positioning pins;
said positioning pins made in one piece with said flanges of said uprights; and
said positioning pins including flat webs projecting beyond the inner sides of said hollow chamber panels.

2. The cold frame according to claim 1, wherein one of said clamping devices is configured to connect two of said side wall elements to one of said uprights, said clamping element of said one of said clamping devices is configured to abut against the inner sides of said hollow chamber panels of said two of said side wall elements and to be clamped between said hollow chamber panels of said two of said side wall elements and said heads of said positioning pins that project beyond said hollow chamber panels.

3. The cold frame according to claim 1, wherein one of said uprights is disposed between said two of said side wall elements, said one of said clamping devices is configured to connect said one of said uprights to said two of said side wall elements, said clamping element of said one of said clamping devices has two clamping limbs, wherein each of said two clamping limbs abuts against the inner side of said hollow chamber panel on a respective one of said two of said side wall elements and is clamped between said hollow chamber panel on the respective one of said two of said side wall elements and said head of a respective said positioning pin projecting out of said through hole in said hollow chamber panel on the respective one of said two of said side wall elements.

4. The cold frame according to claim 3, wherein said one of said uprights has two flanges disposed at a right angle to one another, said one of said clamping devices includes a clamping element with two clamping limbs arranged at a right angle to one another, and each of said two clamping limbs is clamped between said hollow chamber panel of the respective one of said two of said side wall elements and said head of said respective said positioning pin projecting out of said through hole in said hollow chamber panel of the respective one of said two of said side wall elements.

5. The cold frame according to claim 4, wherein said clamping element has a transverse wall forming a reinforcement and connecting said two clamping limbs to one another.

6. The cold frame according to claim 1, wherein said flat webs of said positioning pins abut against said flanges of said uprights, said positioning pins carry said heads at respective free ends thereof, and said clamping elements that abut against the inner sides of said hollow chamber panels are clamped between said hollow chamber panels and said heads of said positioning pins.

7. The cold frame according to claim 6, wherein said clamping elements are formed with elongate slots, said flat webs of said positioning pins are formed with necks received in said elongate slots, and said clamping elements include clamping sections reaching underneath said heads of said positioning pins.

8. The cold frame according to claim 7, wherein said elongate slots formed in said clamping elements are wedge-shaped, with a wider open end and a narrower closed end.

9. The cold frame according to claim 7, wherein said clamping elements formed with said elongate slots are configured for sliding onto said positioning pins that project beyond the inner sides of said hollow chamber panels, in a direction transverse in relation to said positioning pins, and for clamping between said hollow chamber panels and said heads of said positioning pins by way of said clamping sections thereof.

10. The cold frame according to claim 1, wherein said positioning pins are integrally formed on said flanges of said uprights.

* * * * *